United States Patent [19]
Beitzel

[11] Patent Number: 5,865,414
[45] Date of Patent: Feb. 2, 1999

[54] MECHANICAL ARM MECHANISM FOR MOVABLY SUPPORTING A MULTI-POSITION WORK SURFACE

[76] Inventor: Karl H Beitzel, 2855 Pine Creek Dr., # C-207, Costa Mesa, Calif. 92626-7416

[21] Appl. No.: 574,293

[22] Filed: Dec. 18, 1995

Related U.S. Application Data

[63] Continuation-in-part of Ser. No. 349,452, Dec. 2, 1994, abandoned, which is a continuation of Ser. No. 128,004, Sep. 28, 1993, abandoned.

[51] Int. Cl.$^6$ .................................................... A47B 97/04
[52] U.S. Cl. .......................... 248/447; 248/284; 248/462
[58] Field of Search ..................................... 248/447, 454, 248/455, 460, 462, 463, 464, 371, 398, 281.11, 284.1; 108/1, 4, 5, 9

[56] References Cited

U.S. PATENT DOCUMENTS

| | | | |
|---|---|---|---|
| 596,931 | 1/1898 | Yunck | 248/398 |
| 1,254,569 | 1/1918 | Boal | 248/457 |
| 1,847,398 | 3/1932 | Hurych | 108/4 |
| 1,897,321 | 2/1933 | Mitchell et al. | 108/4 |
| 1,900,250 | 3/1933 | Mitchell et al. | 108/4 |
| 2,743,550 | 5/1956 | Felice | 248/457 |
| 3,033,500 | 5/1962 | Graves | 248/284.1 X |
| 3,189,393 | 6/1965 | Crawford | 108/4 |
| 3,586,324 | 6/1971 | Bearson | 248/284.1 X |
| 3,605,650 | 9/1971 | Hebel et al. | 108/9 |
| 3,908,560 | 9/1975 | Horner | 108/4 |
| 4,196,674 | 4/1980 | Van Laarhoven et al. | 108/4 |
| 5,014,953 | 5/1991 | Warnan et al. | 248/284.1 |
| 5,108,063 | 4/1992 | Koerber, Sr. et al. | 248/284 |
| 5,133,547 | 7/1992 | Pardi | 248/284.1 X |

*Primary Examiner*—Ramon O. Ramirez
*Assistant Examiner*—Derek J. Berger
*Attorney, Agent, or Firm*—Paul E Milliken; Lee A Germain

[57] ABSTRACT

A mechanical arm mechanism for moving a table or similar board type work surface in an arcuate path from a stored position to one or more user positions at various selected elevations and angles of inclination. The mechanism uses at least one set of spaced apart arms each of which has one end pivotally attached to a respective fixed pivot point on a support member and the opposite end pivotally attached to a respective movable pivot point on the bottom or back side of a board member with the lengths between the fixed pivot points, the moveable pivot points and the arms forming the sides of a trapezoid which sides change their relative angular orientation as the table or board is moved in its arcuate path of travel.

24 Claims, 9 Drawing Sheets

MECHANICAL ARM MECHANISM FOR MOVABLY SUPPORTING A MULTI-POSITION WORK SURFACE

RELATED INVENTIONS

This invention is a continuation-in-part of Ser. No. 08/349,452, filed Dec. 2, 1994, now abandoned which is herewith and which in turn is a continuation of Ser. No. 08/128,004, filed Sep. 28, 1993, which is now abandoned.

FIELD OF INVENTION

This invention generally pertains to mechanical arm mechanisms which may be applied to moving a table or similar board type work surface from an initial orientation or position to one or more alternative positions.

More particularly, this invention provides a mechanical arm mechanism which may be configured for various sized board surfaces depending upon its application and to a method of determining the multiple parameters of the mechanism such as to move the board surface from an initial position to one or more alternative user positions, the method being applicable irrespective of the selected alternative user position.

BACKGROUND OF THE INVENTION

There are many and various types of mechanical arm mechanisms in the art and conventionally each is specific to a particular motion problem. Many of these comprise parallel arms or links which must remain parallel throughout the motion excursion while others comprise link-and-cam arrangements which compensate for possible interference between the links as they are moved from one position to an alternative position. Most of these prior art mechanisms must function in a limited way to move a table or like-type board surface from a first initial position to a second alternative user position and the same configuration of arm mechanism may not be reconfigured to other applications which effect a change in both of the initial and alternative user positions.

It is, therefore, an object of this invention to provide a mechanical arm mechanism which may be applied to many and various types of applications.

Another object of the invention is to provide a method of determining the various and multiple parameters which comprise a mechanical arm mechanism such that a table or like-type board surface may be moved from an initial position to an alternative user position, and this, irrespective of the selected alternative user position and not being constrained by parallel arm motion.

A further object of the invention is to provide a mechanical arm configuration which may comprise a two-arm configuration, a three-arm configuration or multiples of these such as to move various sized board surfaces from an initial vertical position to any other alternative position selected by the user.

A still further object of the invention is to provide a mechanical arm mechanism wherein the various and multiple parameters of the mechanism are preselected such as to provide a particular board surface motion exhibiting multiple alternative user positions and/or board angles.

These and other objects of the invention will become more fully apparent as the description proceeds in the following specification and the accompanying drawings.

SUMMARY OF THE INVENTION

A mechanical arm mechanism for supporting and moving a table or similar board member in an arcuate path of travel between a first and second position located remotely from each other at opposite ends of the path of travel comprising: a fixed support structure having a first fixed pivot means and a second fixed pivot means attached thereto; the first and second fixed pivot means each having a horizontal axis which is parallel to the axis of the other pivot means; the axis of both the first and second fixed pivot means lying in a common plane; a substantially flat movable board member having a user surface facing away from the fixed support structure and a backside mounting surface facing toward the fixed support structure; an first movable pivot means fixedly attached to the mounting surface of the board member toward one edge thereof; a second movable pivot means fixedly attached to the mounting surface of the board member at a spaced distance from the first movable pivot means; the first and second movable pivot means each having an axis which is parallel to the axis of the other and both axis lying in a common plane and both said movable pivot means being simultaneously movable with the board member; a first arm means having one end pivotally connected to the first fixed pivot means and its opposite end pivotally connected to the first movable pivot means; a second arm means having one end pivotally connected to the second fixed pivot means and its opposite end pivotally connected to the second movable pivot means; the first arm means adapted to pivot around the fixed first pivot means and the second arm means adapted to pivot around the second fixed pivot means when the board member is moved between the first and second position; and means to selectively retain the board member in any one of a plurality of positions within its path of travel.

DESCRIPTION OF THE DRAWINGS

The invention is illustrated in the following drawing figures in which like-parts bear like reference numerals.

DESCRIPTION OF THE PREFERRED EMBODIMENTS

Figures 1, 1A:
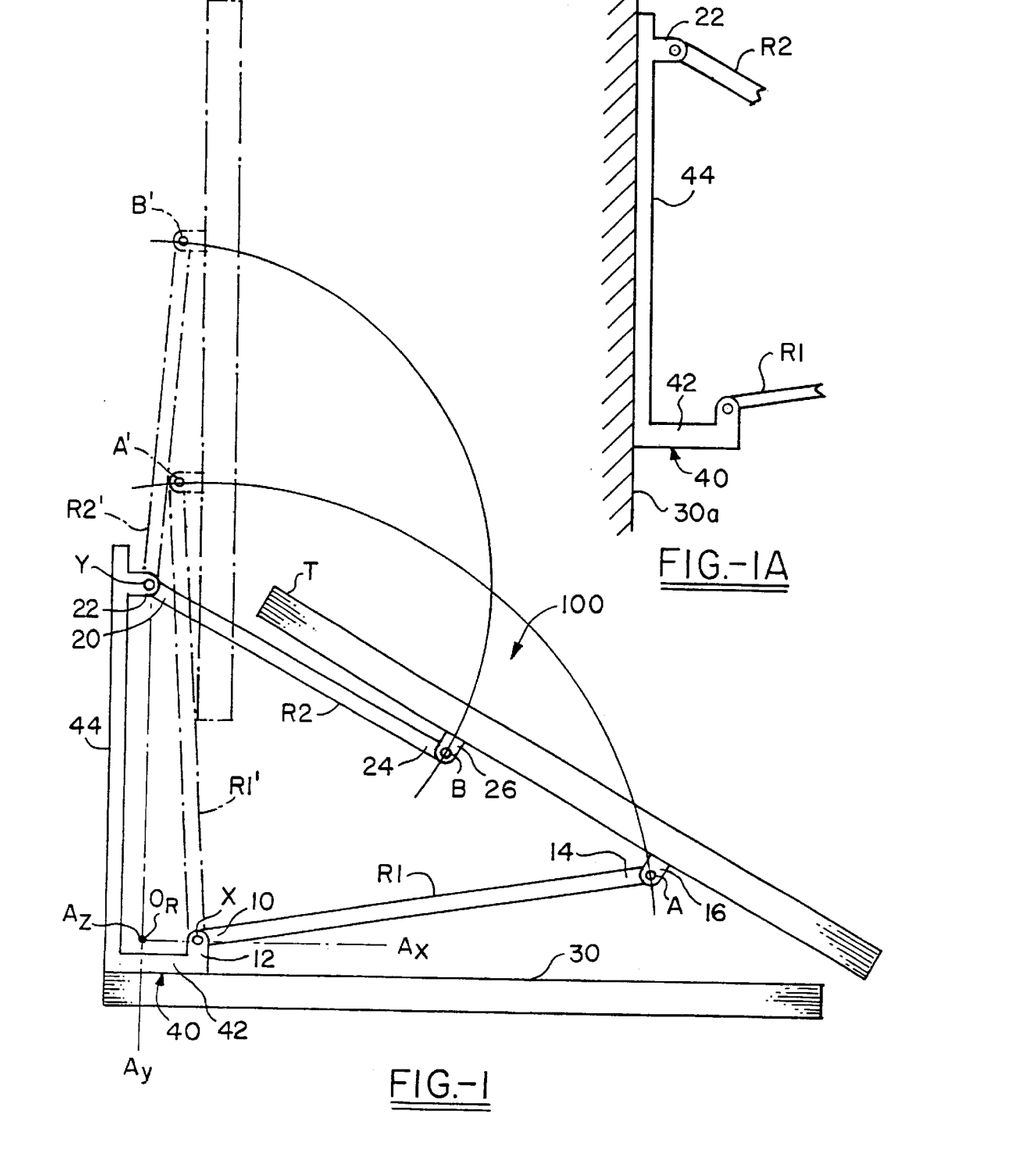
FIG. 1 is a side elevational view of a basic embodiment an adjustable arm mechanism of the invention which functions to move a table or like-type board surface from an initial first position shown in broken lines to an alternative second user position shown in solid lines.
FIG. 1A is a fragmentary side of elevational view of the embodiment of FIG. 1 showing the device mounted on a vertical surface.

FIG. 1 shows a mechanical arm mechanism indicated by the numeral 100. The arm mechanism 100 has at least one pair of arms R1 and R2 each rotatable about a pivot point X and Y respectively and movably carrying a table or like-type board surface from a substantially vertical or first position T' shown in broken lines to an alternative position T shown in solid lines. Either position can be the stored or user position. In any event, the R1 arm has a base end 10 rotatably mounted in a base support 12 and an opposite end 14 rotatably mounted in a table support 16. The base support 12 is stationary with respect to the table T and it is affixed at a point X with reference to a zero $0_R$ reference on a horizontal axis indicated by line Ax while the table support 16 is affixed to the table at a point A on the backside surface as indicated in the figure. The R2 arm has a base end 20 rotatably mounted in a base support 22 and an opposite end 24 rotatably mounted in a table support 26. The base support 22 is stationary with respect to the table T and it is affixed at a point Y with reference to the zero $0_R$ reference and on a vertical axis as indicated by line Ay while the table support 26 is affixed to the table at a point B on its backside surface as indicated in the figure. It will, of course, be recognized that the A and B and X and Y mounting points are pin-type mountings, the pins having axis in line with an orthogonal Az axis to provide the rotational motion of the R1 and R2 arms in their respective stationary 12,14 and motion 22,24 mountings.

The R1 and R2 arms may have their base ends 10 and 20 mounted in various type arrangements to accomplish the various objects of the invention. For example, the base ends may be rotatably mounted in respective base supports 12 and 22 which form part of a unitary L-shaped support member indicated generally at reference numeral 40. The member 40 has a horizontal leg 42 to which the R1 base support 12 may be affixed in any suitable manner and a vertical leg 44 to which the R2 base support 22 may be affixed in like manner. The member 40 may thus be mounted to any surface 30 via its horizontal leg 42 or, alternatively, it may be mounted to any suitable vertical surface such as a wall 30a or the like via its vertical leg 44 as show in FIG. 1A. In addition, the rotatable arm base supports 12 and 22 may be individually and separately affixed to any available and suitable surfaces that may be present. The invention is not, therefore, considered limited to a particular manner or configuration of base support mountings. The various positions of the base supports 12 and 22 relative to their X and Y mounting locations will, however, be dictated in accordance with the teachings of this invention as will the other primary parameters of the arm mechanism 100 and this will become apparent as the description proceeds.

It should be understood that a primary purpose of this invention is to provide a rotatable mechanical arm mechanism which may move a board surface from an initial position to an alternative user position and a method of determining the various parameters of the mechanism irrespective of the specific angular position of the board surface when in the alternative user position. For example and referring to the showing of FIG. 1, it can be appreciated that the fixed positions of the base support members 12 and 22 at their respective X and Y point locations may be varied with respect to each other as well as with reference to the zero $0_R$ reference. Also, the motion mounting locations of the rotatable supports 16 and 26 may be varied at their respective A and B point locations on the backside of the board or table T. In addition to this, the R1 and R2 arms may also be varied in their respective lengths and all these variables pose a dilemma to the designer as to what the various parameter values should be to accomplish a specific user board surface movement and/or position.

Figure 2A:
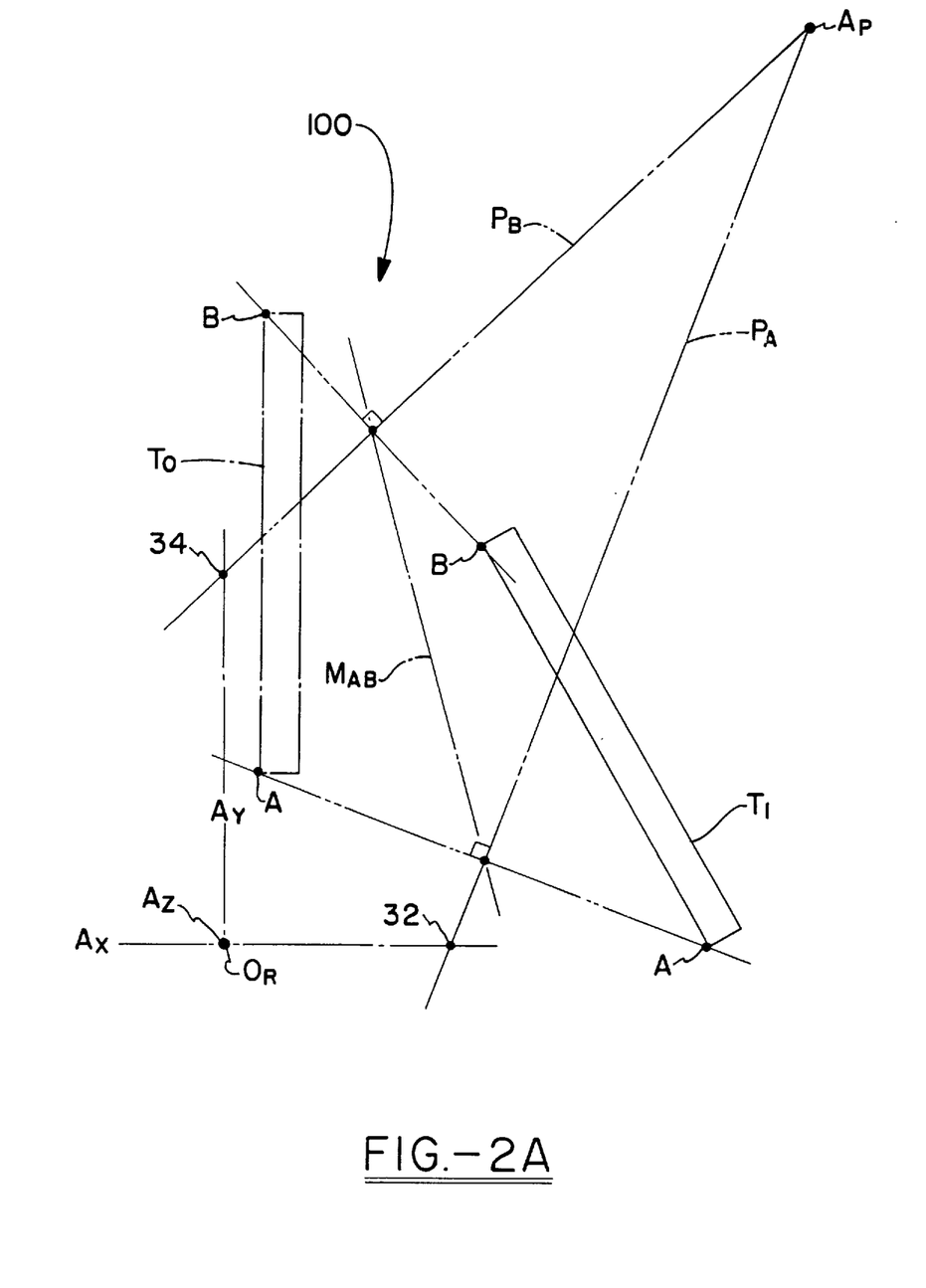
FIGS. 2A and 2B diagrammatically illustrate a method according to this invention for determining the multiple parameters of an adjustable arm mechanism for any user position of the board surface.
Figure 2B:
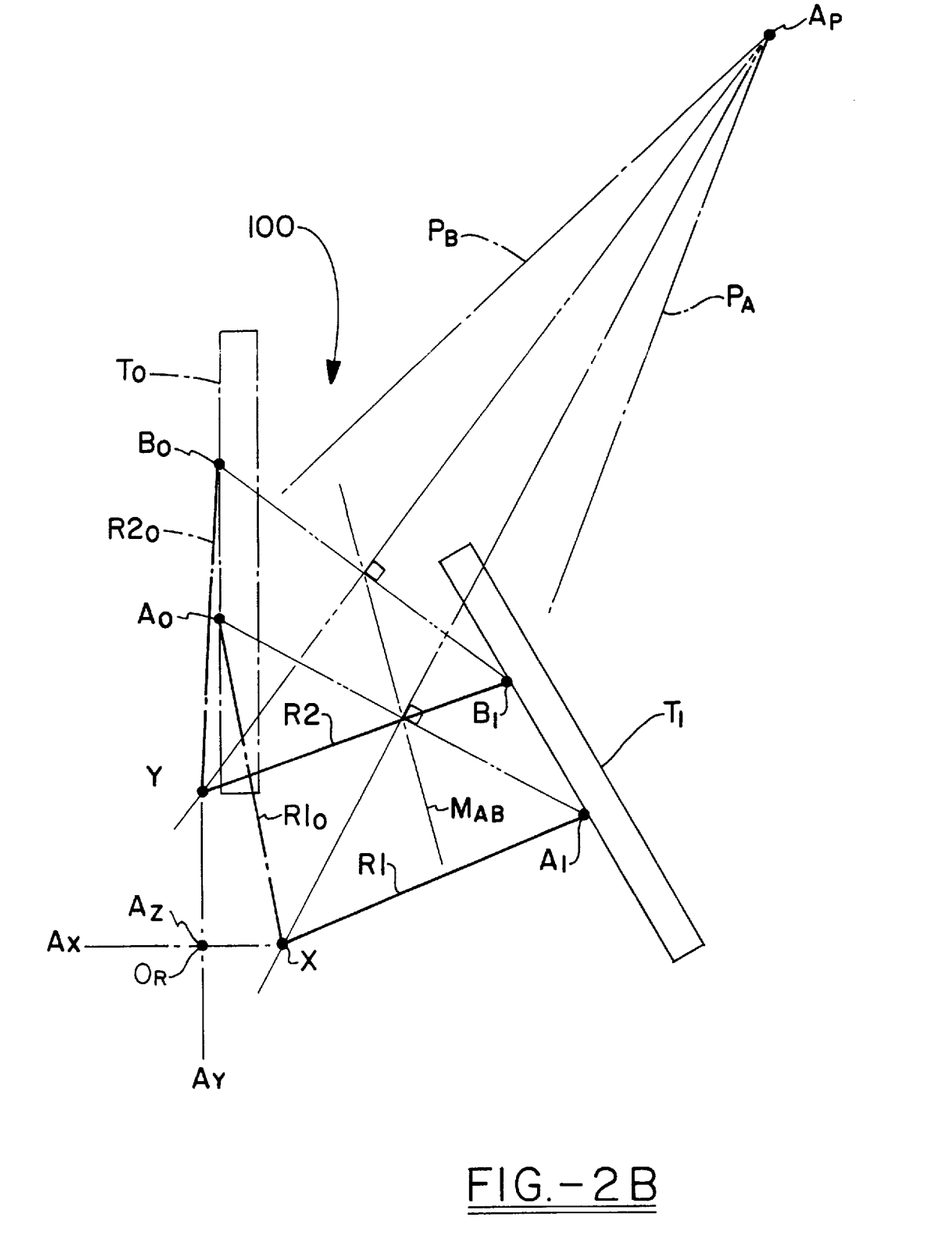

Referring now to FIGS. 2A and 2B of the drawings, a method is illustrated by way of a scaled two-dimensional drawing which provides a solution for determining the values of the arm mechanism parameters, which method is applicable to any situation wherein a table T or other user board surface may be moved from an initial position to an alternative user position. Conventionally, a single drawing will suffice for this purpose but it has been separated into two figures for the ease and understanding of this description.

With reference firstly to FIG. 2A, one must establish the desired positions of a table T and these may include an initial position as indicated at $T_0$ and an alternative user position as indicated at $T_1$ in the drawing. The two tables are identical in all dimensional respects and these are drawn to any convenient scale with reference to a horizontal Ax axis and to a vertical Ay axis as these axis are referenced to a zero $0_R$ reference point as illustrated. To reiterate, the particular table positions as shown are totally arbitrary and the selection illustrated is solely for the purposes of this example as any other positions may have been selected.

Next, the A and B table support or mounting points are arbitrarily selected and preferably these will be at points of their greatest separation on the two drawn table figures $T_0$ and $T_1$. The two A points are interconnected by a line A—A and the two B points are interconnected by a line B—B and perpendiculars $P_A$ and $P_B$ are drawn through the midpoints of each and these intersect at an axis point indicated at $A_p$. The angular relationship as between the $P_A$ and $P_B$ perpendiculars with respect to their crossovers with the Ax and Ay axis at reference numeral 32 and 34 respectively, establishes a limit for locating the X and Y stationary mounting points of the arm mechanism base supports 12 and 22 hereinbefore described with respect to FIG. 1. This will be more fully described and appreciated as the description proceeds. In any event, a line $M_{AB}$ is drawn interconnecting the crossover points of the perpendiculars $P_A$ and $P_B$ with their respective A—A and B—B lines.

With reference now to FIG. 2B of the drawings, the X and Y stationary mounting points are selected and these may be located anywhere within the bounds established by the $P_A$ and $P_B$ perpendiculars as established by their intersections with the respective Ax and Ay axis as shown in FIG. 2A. For this specific example, the X point location is selected on an Ax axis while the Y point location is selected on an Ay axis. The X point location is selected to be about one-half the distance from the $0_R$ zero reference as is the Y point location. Again, this is an arbitrary selection of the X and Y point stationary mounting locations as any others may have been selected. For example, a selection may have been dictated by a particular table mounting environment and/or user desired location. In any event, lines are now drawn through the X and Y point locations to the $A_P$ axis point and, where these intersect the $M_{AB}$ line, a pair of perpendiculars are drawn to the $T_0$ and $T_1$ table figures. The perpendicular drawn through the X-to-Ap line establishes the location of the table mounting point A and these are indicated at $A_0$ and $A_1$ on the two table figures. The perpendicular drawn through the Y-to-Ap line establishes the location of the table mounting point B and these are indicated at $B_0$ and $B_1$ on the two table figures.

The arm lengths for arms R1 and R2 are thus defined and these are drawn such that arm R1 connects the X stationary mounting point with the $A_1$ table mounting point for the table in the $T_1$ user position and to the $A_0$ table mounting point for the table in the $T_0$ initial position. The arm R2 is drawn connecting the Y stationary mounting point with the $B_1$ table mounting point for the table in the $T_1$ user position and with the $B_0$ table mounting point for the table in the $T_0$ initial position.

It should now be appreciated that, for any table or board surface size, a scaled two-dimensional diagram may be drawn which will determine all of the parameters necessary for constructing an adjustable mechanical arm mechanism which will function to move a board surface from an initial $T_0$ position to an alternative $T_1$ user position, and this, irrespective of any desired initial and/or alternative user position.

Figure 3:
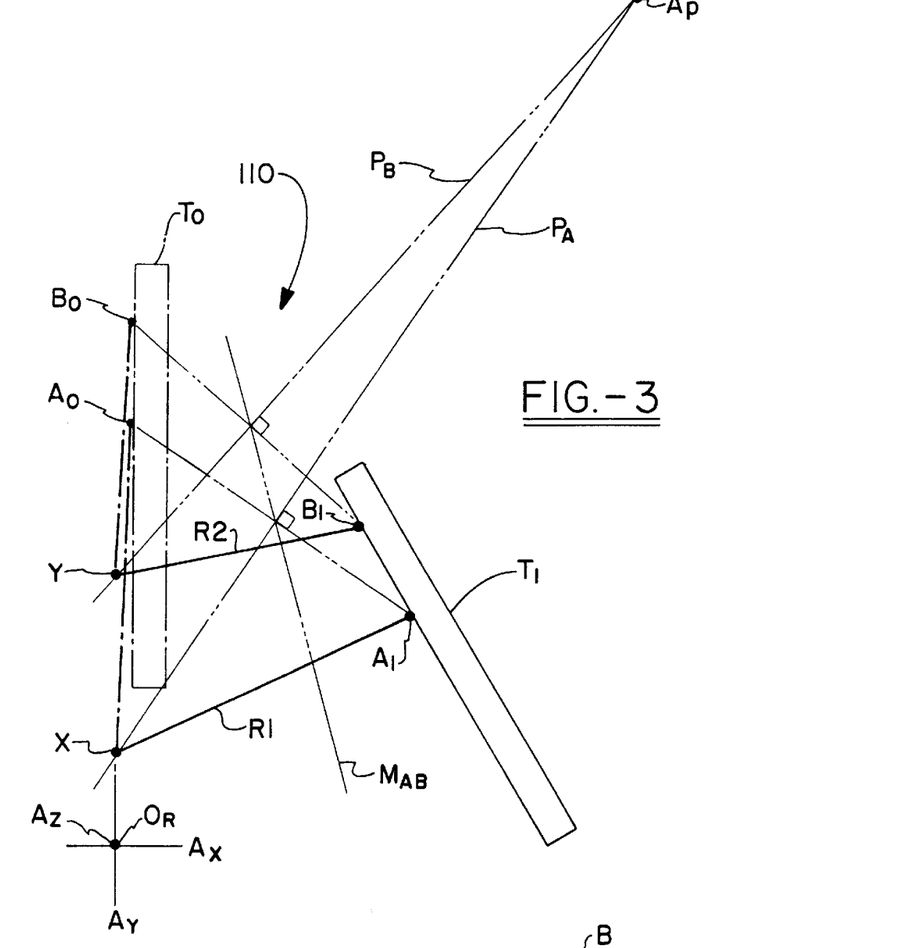
FIG. 3 diagrammatically illustrates the method according to FIGS. 2A and 2B for a particular user board surface position.

Referring now to FIG. 3 of the drawings, a specific example of the invention is diagrammatically illustrated wherein a table user position $T_1$ is oriented similarly to that shown in FIGS. 2A and 2B but, in this case, the two locations of the stationary X and Y mounting points are limited by circumstances of the environment or for other reasons. For example, the user may have to place the arm rotatable mounts 12 and 22 at their respective X and Y stationary mounting locations in a substantially vertical position as illustrated in the figure. The mounting may be to a wall or other suitable vertical surface. Following the method steps described above, the A and B motion mounting points are located on the backside surface of a board as illustrated and the R1 and R2 arm lengths are clearly much different one with respect to the other. Nonetheless, the method of the invention still provides a viable mechanical arm configuration 110 that moves a table T from an initial position at $T_0$ to an alternative user position at $T_1$. This could not have been done by selecting particular values of the various parameters as such would have been a trial-and-error approach and not easily accomplished.

It will be recognized from the above descriptions that a particular arrangement may be used wherein the X and Y stationary mounting locations are more limiting. For example and referring to FIG. 2B of the drawings, one may arbitrarily select the board surface backside motion mounting points $A_1$ and $B_1$ on table $T_1$ and $A_0$ and $B_0$ on table $T_0$. These are interconnected by lines $A_1$–$A_0$ and $B_1$–$B_0$ and the midpoints of these lines are intersected by perpendiculars $P_A$ and $P_B$. The X and Y mounting points may now be located anywhere on each of these $P_A$ and $P_B$ lines. The R1 arm is now drawn to interconnect the X stationary mounting point that is on the $P_A$ line with the $A_1$ and $A_0$ motion mounting points and the R2 arm is drawn to interconnect the Y stationary mounting point that is on the $P_B$ line with the $B_1$ and $B_0$ motion mounting points. As stated, this combination is more limiting in that the X and Y stationary mounting points must lie along the respective $P_A$ and $P_B$ perpendiculars.

Figure 4:
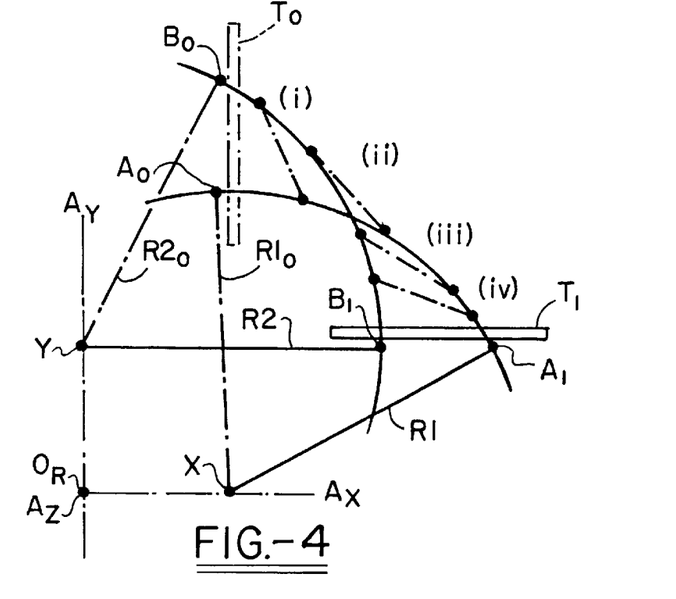
FIG. 4 diagrammatically illustrates a second embodiment wherein the parameters of an adjustable arm mechanism are pre-selected without any regard to a particular board surface position.
Figure 5:
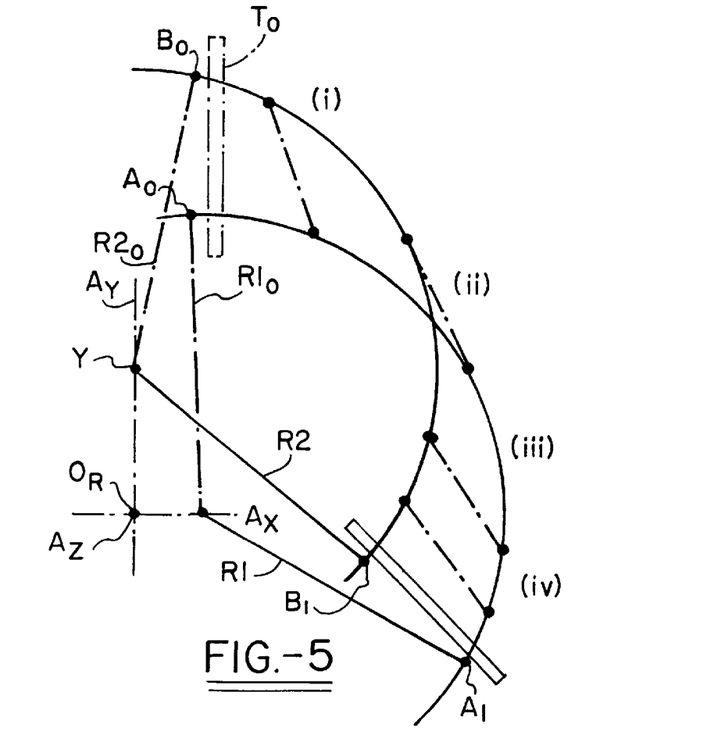
FIG. 5 diagrammatically illustrates the embodiment of FIG. 4 wherein a particular parameter is changed.

With reference to FIGS. 4 and 5 of the drawings, a second embodiment of the invention is diagrammatically illustrated wherein the various parameters of a mechanical arm mechanism are pre-selected. For example, the arms R1 and R2 are selected to exhibit equal arm lengths, i.e., AX=BY. In addition, the locations of the X and Y stationary mounting points are selected such that X is the same distance on an Ax axis from the zero $0_R$ reference as Y is on an Ay axis. If the starting position of a table T is at the vertical $T_0$ position as illustrated in the figure, then the A and B table mounting positions are predetermined by the R1 and R2 arm lengths and the X and Y point locations. It can be appreciated from this that the pre-selection of equal arm lengths and of the stationary mounting point locations will provide an arm mechanism 120 which moves a table from a vertical $T_0$ position to an alternative $T_1$ user position. While a user position at $T_1$ is horizontally oriented at the limit of the motion excursion, other user positions are also available as shown in the ghost dot-dashed positions at (i), (ii), (iii) and (iv).

FIG. 5 illustrates the same mechanism as shown in FIG. 4 but the location of the X stationary mounting point is changed such that it is positioned one-half the distance from the zero $0_R$ reference than is the Y stationary mounting point. In this configuration, the R1 and R2 arms may each rotate through a greater circular arc and exhibit various other table surface positions as some of these are indicated at (i), (ii), (iii) and (iv) in the drawing. One cannot in this configuration achieve a horizontal table attitude as was possible in the FIG. 4 configuration. In this respect it can be shown that, as the X mounting point is moved closer to the zero $0_R$ reference, the surface T tends to go more vertical throughout the arcuate excursion. In fact, when the X stationary mounting point is at the zero $0_R$ reference the table surface T will remain vertical throughout its arcuate excursion which will extend through an arc of 180°.

From the above descriptions of FIGS. 4 and 5, one can appreciate the advantages of the method described with respect to FIGS. 2A–2B. While the FIGS. 4 and 5 have the advantage of eliminating the multiple variables of a mechanical arm mechanism, the limitation exists as to the user board surface positions which may be achieved. In contrast, the method of FIGS. 2A–2B requires only that the initial and alternative user positions of the board surface T be selected. It should be noted that the method may be applied for finding the parameters of any mechanical arm mechanism and this applies also to the embodiment illustrated in FIGS. 4 and 5. The reverse is not true, i.e., a preselection of parameters as given in FIGS. 4 and 5 limits the board surface positions and one must be content with those attained by the motion of the arm mechanism.

Figure 6:
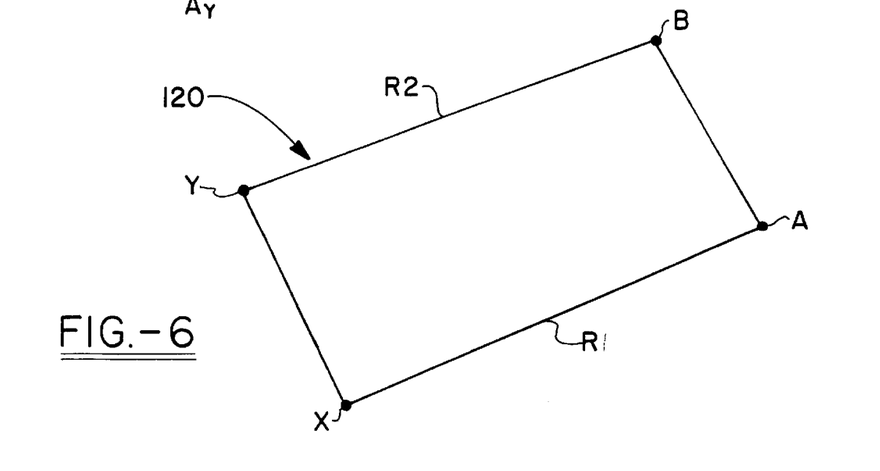
FIG. 6 diagrammatically illustrates the various principal parameters as these comprise a quadrilateral geometric figure or, more specifically, a trapezium which exhibits the characteristics of this invention.

Referring now to FIG. 6 of the drawings, a geometric figure in the form of a quadrilateral 120 is illustrated. It will be recognized that the quadrilateral 120 comprises a trapezium in which no two sides thereof are parallel. This contrasts with the parallelagram in which all opposite sides are parallel and, therefore, equal in length. As shown in the drawing, two of the sides are formed by the two R1 and R2 arms of the mechanical arm mechanism and these have lengths AX and BY respectively while the other two sides comprise lengths XY between the stationary mounting points and AB between the motion mounting points on the backside surface of the board surface T. In this respect, it has been determined that the relationship AX+AB<BY+XY holds true for all mechanical arm mechanisms of this invention. The relationship holds true, irrespective of the position or orientation of the alternative user position at $T_1$ and/or the locations of the X and Y stationary mounting points of the R1 and R2 arms. The only limitation is that both the X and Y stationary mounting points must be located within the bounds defined by the $P_A$ and $P_B$ perpendiculars hereinbefore described. Contrary to this, the prior art systems using arms that remain parallel throughout their range of motion require that AX=BY and AB=XY creating a relationship AX+AB=BY+XY. It should be pointed out here that, in a single exception, the trapezium may exhibit the relationship AX+AB=BY+XY and this happens when AX≠BY and AX=XY. This invention, therefore, is considered to cover this exception to the above-stated relationship AX+AB BY+XY.

Figure 7:
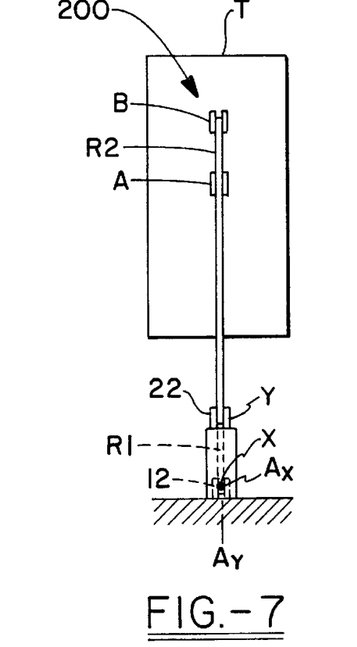
FIG. 7 is a rear elevational view of a two-arm mechanism according to the invention as may be applied to support a lightweight table or like-type board surface.
Figure 8:
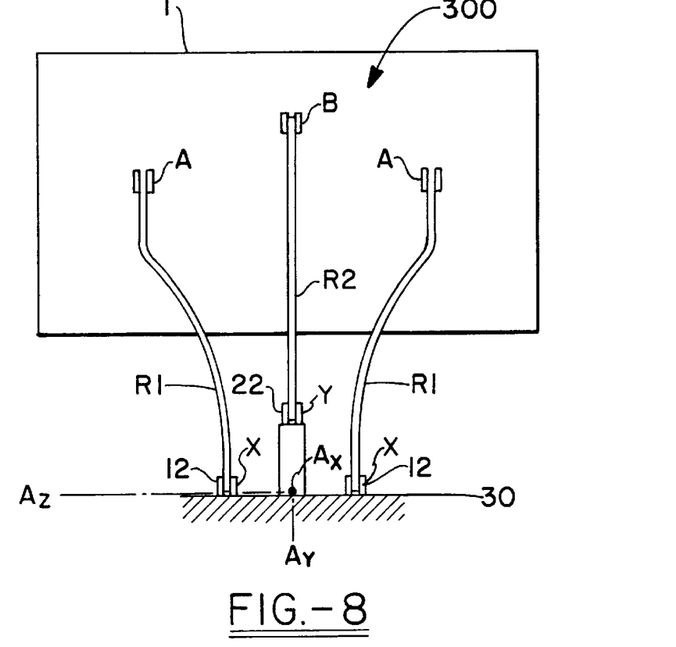
FIG. 8 is a rear elevational view of a three-arm mechanism as may be applied to support a larger table or like-type board surface.
Figure 9:
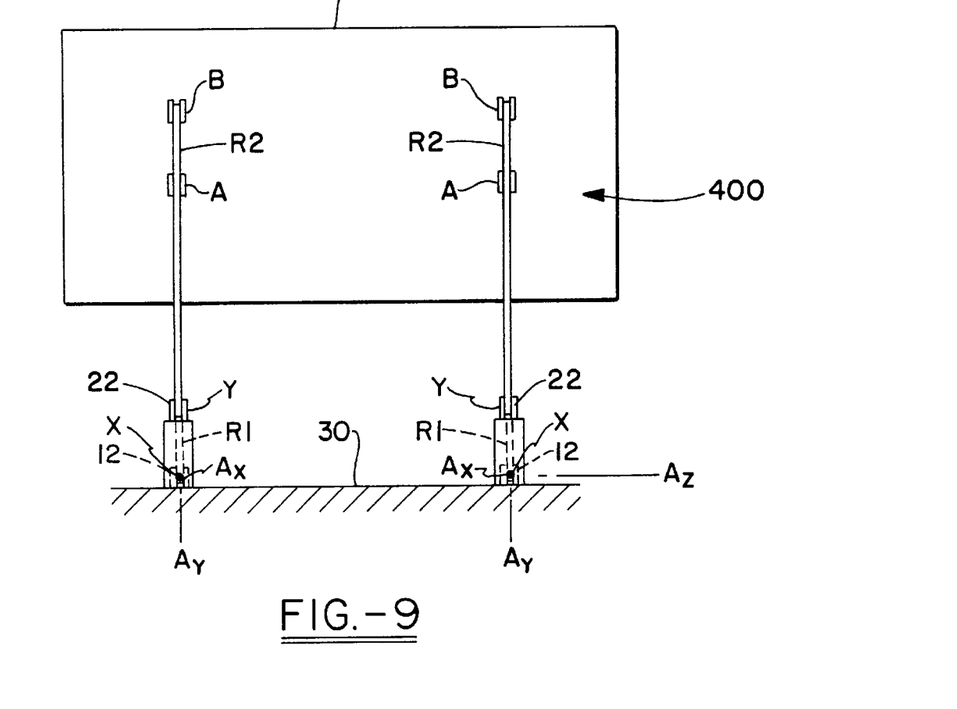
FIG. 9 is a rear elevational view of a four-arm configured mechanism comprising multiple two-arm mechanisms as may be applied to supporting very large tables or like-type board surfaces.

A mechanical arm mechanism according to this invention may be configured into various arm arrangements and the primary ones of these are illustrated in FIGS. 7, 8, and 9 of the drawings. In FIG. 7, a two-arm mechanism is illustrated from a backside elevational view and generally indicated by reference numeral 200. A board T may comprise a picture, a posterboard, an artist's easel, or any other like-type or sized board surface in which a two-arm mechanism will be sufficient for moving and maintaining board surface position.

FIG. 8 illustrates a three-arm mechanism also from a backside elevational view and generally indicated by reference numeral 300. In this configuration, the X and Y stationary mounting points are located on their respective Ax and Ay axis as hereinbefore described but, they are also separated along parallel Az axis. For example, if the drawing page is held vertically in front of the eye of the viewer, then a horizontal X-plane will be perpendicular to the page and a vertical Y-plane will be perpendicular to the page while a Z-plane will comprise the surface of the page. Accordingly, a parallel Ax axis will pass through each of the X stationary mounting points at the arm mounts 12 and the mounts will be separated and in-line along a common Az axis while an Ay axis will pass through the stationary Y mounting point at the arm 22 and it will be located on an Az axis in a parallel Z-plane.

FIG. 9 illustrates a four-arm adjustable mechanism from a backside elevational view and generally indicated by reference numeral 400. The mechanism 400 obviously comprises two two-arm mechanisms of the type shown in FIG. 7 and these are in spaced-apart positions along Az axis. This arrangement may be used for larger board surfaces T and it can be seen from this that the number of arms R1 and R2 may be increased according to the size and weight of the surface T. while still being within the scope of the present invention. This invention, therefore, is not considered to be limited in any way to the number and/or arrangement of the R1 and R2 arms of the mechanical arm mechanism.

Figures 10A, 10B, 10C, 11A, 11B:
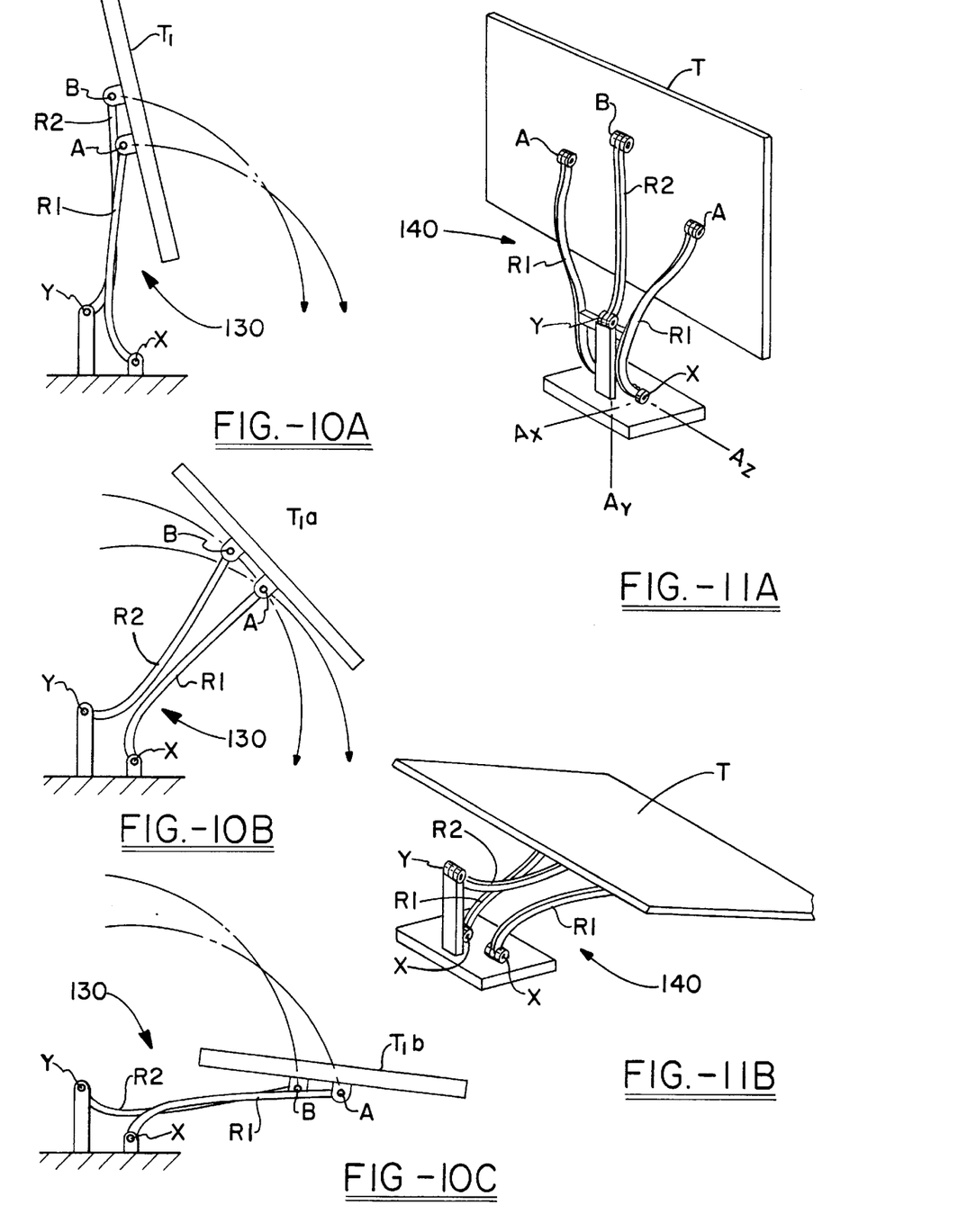
FIGS. 10A, 10B, and 10C are side elevational views of an arm mechanism which may comprise a two-arm configuration, a three-arm configuration, or various multiples of these in accordance with this invention.
FIGS. 11A and 11B are rear perspective views of a three-arm mechanism as may be configured from the teachings of this invention.

Referring now to FIGS. 10A, 10B, and 10C of the drawings, a mechanical arm mechanism according to this invention is illustrated in a side elevational view and generally indicated by reference numeral 130. The motion of a table T is illustrated as it moves from an initial position at $T_0$ to a first alternative user position at $T_1a$ or, to a second alternative user position at $T_1b$. Obviously, in the side elevational views shown, the mechanism 130 may comprises a two-arm arrangement, a three-arm arrangement, or any number of R1 and R2 arms having the proper mountings in Ax, Ay, and Az axis as hereinbefore described.

FIGS. 11A and 11B illustrate a particular configuration of a three-arm mechanism generally indicated by reference numeral 140 as such may be applied to moving and supporting a table or like-type board surface T. As shown, the arms may be configured into various aesthetic shapes while being within the scope of the inventive concept.

Figure 12:
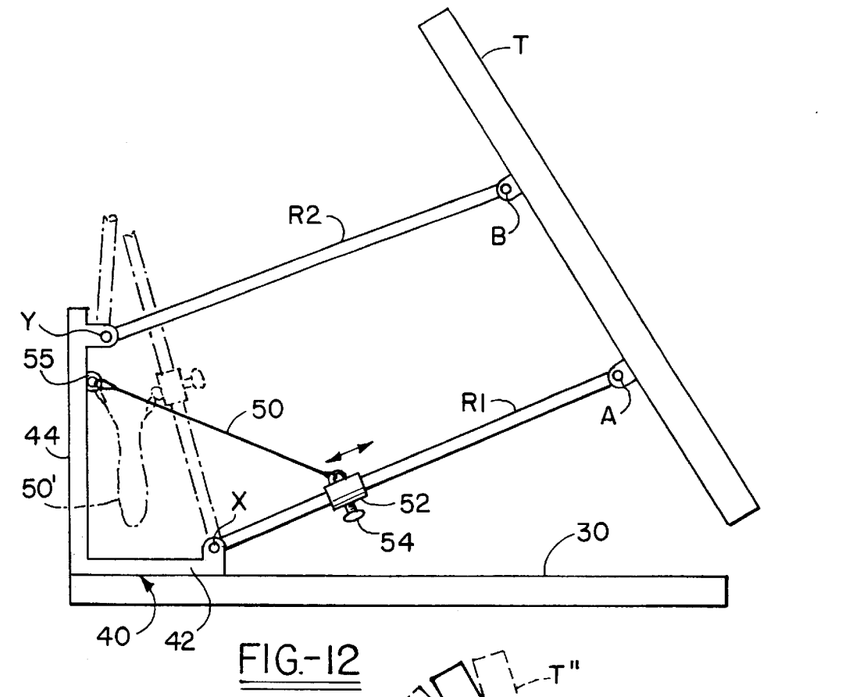
FIG. 12 is a side elevational view showing an embodiment of the invention including a means to adjust the working height of the board surface to various user positions.

FIG. 12 which is similar to the device in FIG. 1 shows a means for stopping the board member or table T at various locations along its arcuate path of travel. This is accomplished by a flexible tether cable 50 which has one end attached to a slidable sleeve 52 which is slideable in either direction along the arm R1 and may be fixed at any desired position by tightening the thumb screw 54. The opposite end is fixedly attached to the vertical leg 44 or may be attached to any fixed mounting which is positioned above and behind the pivot X. By sliding the sleeve 52 along the arm R1 and tightening the thumb screw 54, the elevation of the table T can be set at various heights. Other means of adjusting the elevation of the table T can be used such as a fold down leg or brace on the bottom side of the table, cam stops, friction discs, or tension springs or any other suitable means.

It is anticipated that the present concept will be applied to positioning, for example, a drafting board, a light table, an artist's easel or other graphic arts device over a work station such as a desk top. Referring again to FIG. 1 of the drawings, the horizontal surface 30 may comprise such desk top and this may provide a convenient rest stop for the table T when at the lowered user position or the table T can be stopped at various intermediate elevations by means of the tether 50 in FIG. 12 or by other suitable stop means.

In addition to adjusting the elevation of the table T to multiple positions, it is also sometimes desirable to adjust the angle on inclination of the table. This can be accomplished by the device shown in FIGS. 13 and 14 wherein an adjustable slidable linkage 56 is provided to permit the pivot A to be moved to and from the pivot B to shorten and lengthen the distance between the arcuately moveable pivots A and B. It is also desirable to simultaneously shorten or lengthen the arm R1 so that the total length of all the sides of the trapezoid formed by the arms R1 and R2 and the distances between pivot points X and Y and points A and B remains constant. This is necessary so that when the board member or table T is moved along its arcuate path of travel, the board achieves the desired angular position in both the stored and the user positions. To be more specific, each time the arm R1 is shortened to move the table to the angular position such as shown in position T" the distance between pivot points A and B must be lengthened the same amount. Likewise each time the arm R1 is lengthened to move the table to the position T1 the distance between points A and B must be shortened the same amount. On way of accomplishing this result is by the linkage mechanism 56 shown in detail in FIG. 14.

Figure 14:
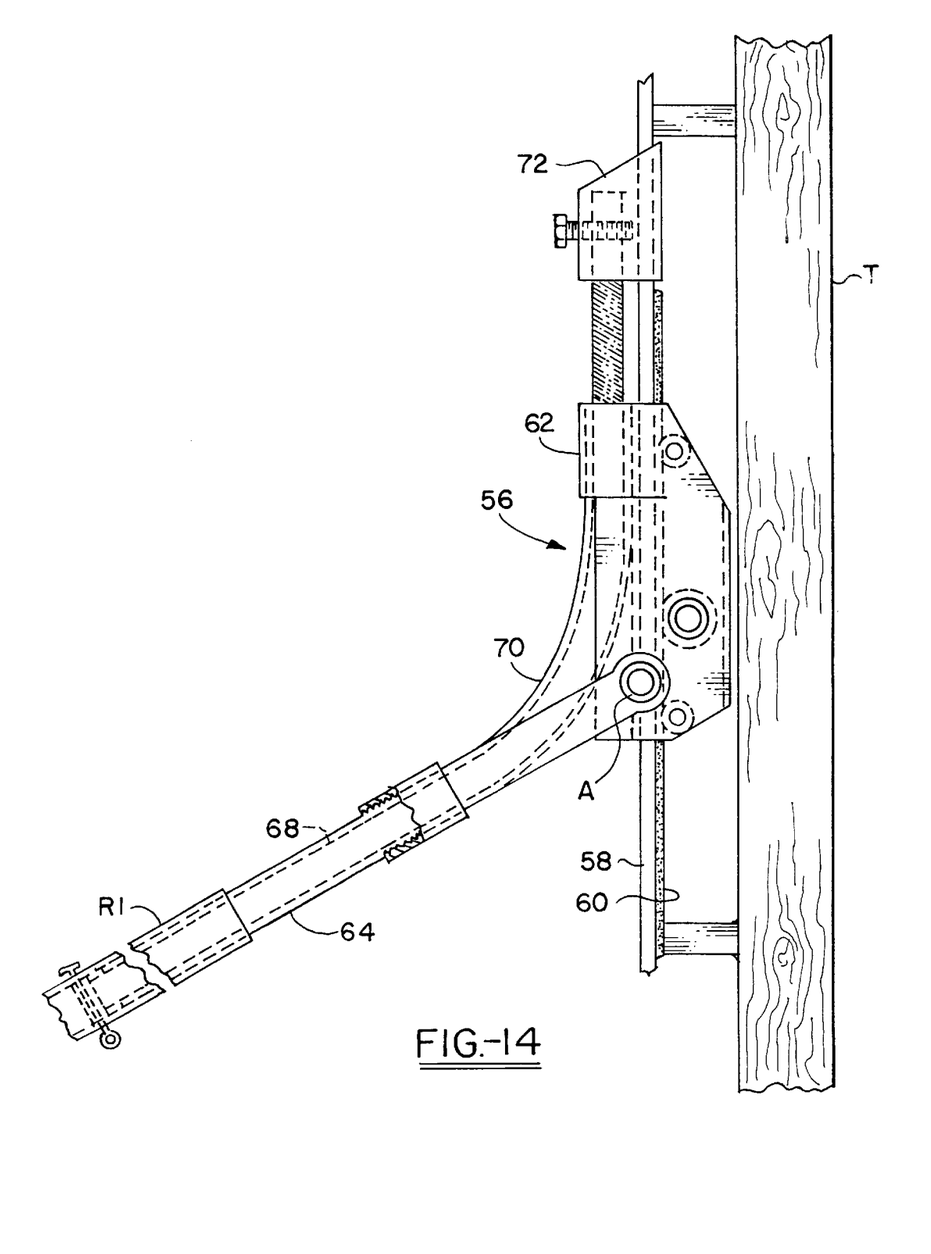
FIG. 14 is an enlarged detailed view of the mechanism for adjusting the angle of inclination of the board surface of the device shown in FIG. 13.

The board or table T has a guide track 58 attached thereto with a rubber grip strip 60 thereon. A sliding pivot bracket 62 carrying pivot pin A is slidable back and forth along the track 58 so that pivot A can be moved to and from pivot B. The arm R1 is adjustably linked to pivot A by a telescoping fitting 64 which carries a cable 68 through a flexible cable housing 70 and then to an anchor bracket 72 fixedly mounted on one end of the track 58. One end of the cable 68 is attached to the arm R1 and the opposite end is anchored to the bracket 72 which is fixed to the track 58 and the table T. As the bracket 62 slides along the track 58 it moves with respect to the cable 68 as does the telescoping fitting 64 to simultaneously change the length of the arm R1 and the length between pivot points A and B. This permits the total length of the sides of the trapezoid ABYX to remain constant even while adjusting the angle of inclination of table T.

Figure 13:
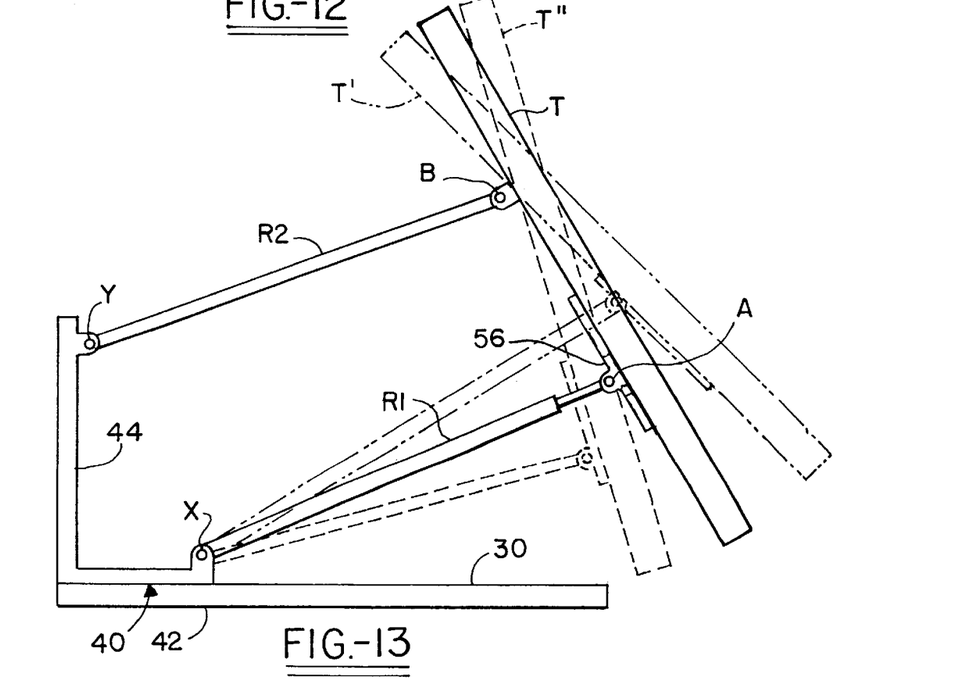
FIG. 13 is a side elevational view showing an embodiment of the invention including a means to adjust the angle of inclination of the board surface to various user positions.

There are, of course, other ways of adjusting the angle of inclination of the table T, however the example shown in FIGS. 13 and 14 is a simple way to accomplish this objective.

Various other modifications can be made in the embodiments shown and described herein without departing from the scope of the invention.

I claim:

1. A mechanical arm mechanism and board member for supporting and moving the board member in an arcuate path of travel between a first and second position located remotely from each other at opposite ends of the path of travel comprising:

a fixed support structure having a first fixed pivot means and a second fixed pivot means attached thereto;

the first and second fixed pivot means each having a horizontal axis which is parallel to the axis of the other pivot means;

the axis of both the first and second fixed pivot means lying in a common plane;

the board member having a user surface facing away from the fixed support structure and a backside mounting surface facing toward the fixed support structure;

a first movable pivot means fixedly attached to the mounting surface of the board member;

a second movable pivot means fixedly attached to the mounting surface of the board member at a spaced distance from the first movable pivot means;

the first and second movable pivot means each having an axis which is parallel to the axis of the other and both axis lying in a common plane and both said movable pivot means being simultaneously movable with the board member;

a first swingable arm means for supporting an end of the board member, having one end pivotally connected to the first fixed pivot means and its opposite end pivotally connected to the first movable pivot means;

a second swingable arm means for supporting an opposite end of the board member, having one end pivotally connected to the second fixed pivot means and its opposite end pivotally connected to the second movable pivot means;

the first swingable arm means adapted to pivot around the first fixed pivot means and the second swingable arm means adapted to pivot around the second fixed pivot means when the board member is moved between the first and second position; and means to selectively retain the board member in any one of a plurality of positions at various elevational levels the path of travel between the first and second position.

2. The mechanical arm mechanism as claimed in claim 1 wherein the means to selectively retain the member in a plurality of positions is a flexible tether means having a first end adjustably attached to a location along the length of one of the arm means and a second opposite end adapted to be attached at a fixed location spaced from and above the first end of the tether means in a location to retain the tether means in tension to hold the said one of the arm means in various adjusted locations for selectively retaining the board in a plurality of positions.

3. The mechanical arm mechanism as claimed in claim 1 wherein the means to selectively retain the board member in a plurality of positions permits the board member to be selectively set at various angles of inclination which best suit the needs of the user of the board member.

4. The mechanical arm mechanism as claimed in claim 3 wherein the means to selectively retain the board member in a plurality of positions at various angles of inclination is an adjustable linkage supporting one of the movable pivot means as a slideable pivot which can be moved toward and away from an other moveable pivot means while simultaneously lengthening or shortening the length of the arm means attached to the slideable pivot.

5. A mechanical arm mechanism and board member for supporting and moving the board member up and down in an arcuate path of travel between a raised and lowered position located remotely from each other at opposite ends of the path of travel comprising:

a fixed support structure having an upper fixed pivot means and a lower fixed pivot means attached thereto;

the upper and lower fixed pivot means each having a horizontal axis which is parallel to the axis of the other pivot means;

the axis of both the upper and lower fixed pivot means lying in a common plane;

the board member having a user surface facing away from the fixed support structure and a backside mounting surface facing toward the fixed support structure;

an upper movable pivot means fixedly attached to the mounting surface of the board member;

a lower movable pivot means fixedly attached to the mounting surface of the board member at a spaced distance below the upper movable pivot means;

the upper and lower movable pivot means each having an axis which is parallel to the axis of the other and both axis lying in a common plane and both said movable pivot means being simultaneously movable with the board member;

an upper swingable arm means for supporting an end of the board member having one end pivotally connected to the upper fixed pivot means and its opposite end pivotally connected to the upper movable pivot means;

a lower swingable arm means for supporting an opposite end of the board member having one end pivotally connected to the lower fixed pivot means and its opposite and pivotally connected to the lower movable pivot means;

the upper arm means adapted to pivot around the upper fixed pivot means and the lower arm means adapted to pivot around the lower fixed pivot means when the board member is moved up or down between the raised or lowered position;

means to selectively retain the board member in any one of a plurality of operative use positions at various elevational levels within its path of travel between the raised and lowered position.

6. The mechanical arm mechanism as claimed in claim 5 wherein the means to selectively retain the board member in a plurality of positions is a flexible tether means having one end adjustably attached to the lower arm means and the opposite end adapted to be attached at a fixed location above and behind the lower fixed pivot means to which the lower arm means is attached.

7. The mechanical arm mechanism as claimed in claim 5 wherein the means to selectively retain the board member in a plurality of positions is adapted to hold the board member selectively set at various angles of inclination which best suit the needs of the user of the board member.

8. The mechanical arm mechanism as claimed in claim 7 wherein the means to selectively retain the board member in a plurality of positions at various angles of inclination is an adjustable linkage supporting one of the movable pivot means as a slideable pivot which can be moved toward and away from as the other moveable pivot means while simultaneously lengthening or shortening the length of the arm means attached to the slideable pivot.

9. The mechanical arm mechanism as claimed in claim 5 wherein the fixed support structure is adapted to be mounted on a vertical surface.

10. The mechanical arm mechanism as claimed in claim 5 wherein the axis of the upper and lower fixed pivot means lie in a common plane which is inclined between a vertical and a horizontal plane.

11. The mechanical arm mechanism as claimed in claim 5 wherein at least one of the arm means includes a plurality of arm members.

12. The mechanical arm mechanism as claimed in claim 5 wherein at least one of the arm means includes a plurality of arm members having pivot means on like ends of like arm means which pivot means are aligned on a common axis with each other.

13. The mechanical arm mechanism as claimed in claim 5 wherein the upper and lower arm means have lengths which form a first pair of two opposite sides of a trapezium while the lengths between the fixed pivot means and between the movable pivot means form a second pair of two opposite other sides of the trapezium and the relative lengths of the four sides of the trapezium defines the relative spacing between all four corners of the trapezium at the pivot points thereby determining the limits of an arcuate path of travel of the board member between the raised and lowered position.

14. The mechanical arm mechanism as claimed in claim 5 wherein the user surface of the board member, when in the raised position, is substantially vertical and when in the lowered position is inclined at an angle between a vertical and horizontal position.

15. The mechanical arm mechanism as claimed in claim 5 wherein the lower arm means is positioned substantially vertically when the board member is in a vertical position.

16. The mechanical arm mechanism as claimed in claim 5 wherein the board member comprises a drafting board.

17. The mechanical arm mechanism as claimed in claim 5 wherein the board member comprises a light table.

18. The mechanical arm mechanism as claimed in claim 5 wherein the board member comprises a graphics arts easel.

19. The mechanical arm mechanism as claimed in claim 5 wherein either the raised or the lowered position can be the user position.

20. The mechanical arm mechanism as claimed in claim 5 wherein both the raised and the lowered position are user positions.

21. The mechanical arm mechanism as claimed in claim 5 wherein the pivot means and the arm members are so arranged as to permit the board member to be moved below the fixed pivot means when in the lowered position.

22. A mechanical arm mechanism and board member for supporting and moving the board member up and down in an arcuate path of travel between a raised and lowered position located remotely from each other at opposite ends of the path of travel comprising:

a fixed support structure adapted to be mounted on a vertical surface, said support structure having an upper fixed pivot means and a lower fixed pivot means attached thereto;

the upper and lower fixed pivot means each having a horizontal axis which is parallel to the axis of the other pivot means;

the axis of both the upper and lower fixed pivot means lying in a common plane;

the board member having a user surface facing away from the fixed support structure and a backside mounting surface facing toward the fixed support structure;

an upper movable pivot means fixedly attached to the mounting surface of the board member;

a lower movable pivot means fixedly attached to the mounting surface of the board member at a spaced distance below the upper movable pivot means;

the upper and lower movable pivot means each having an axis which is parallel to the axis of the other and both axis lying in a common plane and both said movable pivot means being simultaneously movable with the board member;

an upper swingable arm means for supporting an end of the board member having one end pivotally connected to the upper fixed pivot means and its opposite end pivotally connected to the upper movable pivot means; and a lower swingable arm means for supporting an opposite end of the board member having one end pivotally connected to the lower fixed pivot means and its opposite and pivotally connected to the lower movable pivot means;

the upper arm means adapted to pivot around the upper fixed pivot means and the lower arm means adapted to pivot around the lower fixed pivot means when the board member is moved up or down between the raised or lowered position;

the pivot means and the arm members are so arranged as to permit the board member to be moved below the fixed pivot means when in the lowered position.

23. A mechanical arm mechanism and board member for supporting and moving the board member up and down in an arcuate path of travel between a raised and lowered position located remotely from each other at opposite ends of the path of travel comprising:

a fixed support structure having an upper fixed pivot means and a lower fixed pivot means attached thereto;

the upper and lower fixed pivot means each having a horizontal axis which is parallel to the axis of the other pivot means;

the axis of both the upper and lower fixed pivot means lying in a common plane;

the board member having a user surface facing away from the fixed support structure and a backside mounting surface facing toward the fixed support structure;

an upper movable pivot means fixedly attached to the mounting surface of the board member;

a lower movable pivot means fixedly attached to the mounting surface of the board member at a spaced distance below the upper movable pivot means;

the upper and lower movable pivot means each having an axis which is parallel to the axis of the other and both axis lying in a common plane and both said movable pivot means being simultaneously movable with the board member;

an upper swingable arm means for supporting an end of the board having one end pivotally connected to the upper fixed pivot means and its opposite end pivotally connected to the upper movable pivot means;

a lower swingable arm means for supporting an opposite end of the board member, having one end pivotally connected to the lower fixed pivot means and its opposite end pivotally connected to the lower movable pivot means;

the upper arm means adapted to pivot around the upper fixed pivot means and the lower arm means adapted to pivot around the lower fixed pivot means when the board member is moved up or down between the raised or lowered position;

the upper and lower arm means having lengths which form two opposite sides of a trapezoid while lengths between the fixed pivot means and between the movable pivot means form the opposite other two sides of the trapezoid, the trapezoid defining the limits of the arcuate path of travel of the board means; and adjustment means to simultaneously change the lengths of two adjacent sides of the trapezoid without changing the total length of all four sides of the trapezoid to thereby change the angle of inclination of the board member.

24. A mechanical arm mechanism and board member for supporting and moving the board member up and down in an arcuate path of travel between a raised and lowered position located remotely from each other at opposite ends of the path of travel comprising:

a fixed support structure having an upper fixed pivot means and a lower fixed pivot means attached thereto;

the upper and lower fixed pivot means each having a horizontal axis which is parallel to the axis of the other pivot means;

the axis of both the upper and lower fixed pivot means lying in a common plane;

the board member having a user surface facing away from the fixed support structure and a backside mounting surface facing toward the fixed support structure;

an upper movable pivot means fixedly attached to the mounting surface of the board member;

a lower movable pivot means fixedly attached to the mounting surface of the board member at a spaced distance below the upper movable pivot means;

the upper and lower movable pivot means each having an axis which is parallel to the axis of the other and both axis lying in a common plane and both said movable pivot means being simultaneously movable with the board member;

an upper swingable arm means for supporting an end of the board member, having one end pivotally connected to the upper fixed pivot means and its opposite end pivotally connected to the upper movable pivot means; and a lower swingable arm means for supporting an opposite end of the board member, having one end pivotally connected to the lower fixed pivot means and its opposite end pivotally connected to the lower movable pivot means;

the upper arm means adapted to pivot around the upper fixed pivot means and the lower arm means adapted to pivot around the lower fixed pivot means when the board member is moved up or down between the raised or lowered position;

the pivot means and the arm members being so arranged as to permit the board member to be moved below the fixed pivot means when in the lowered position.

* * * * *